United States Patent [19]
Nakatani

[11] Patent Number: 5,083,147
[45] Date of Patent: Jan. 21, 1992

[54] PANHEAD

[75] Inventor: Koichiro Nakatani, Tokyo, Japan

[73] Assignee: Velbon International Corporation, Torrance, Calif.

[21] Appl. No.: 376,134

[22] Filed: Jul. 6, 1989

Related U.S. Application Data

[63] Continuation-in-part of Ser. No. 302,011, Jan. 26, 1989.

[51] Int. Cl.$^5$ ............................................. G03B 17/00
[52] U.S. Cl. ..................... 354/293; 352/243; 248/177
[58] Field of Search ............... 354/81, 293; 248/177, 248/178, 179, 183, 185, 187; 352/243

[56] References Cited

U.S. PATENT DOCUMENTS 3,712,571  1/1973  Miller et al. ................. 248/183

FOREIGN PATENT DOCUMENTS 3429925  1/1986  Fed. Rep. of Germany ...... 248/178
35833    2/1935  Netherlands ..................... 248/179

Primary Examiner—Brian W. Brown
Attorney, Agent, or Firm—Beehler & Pavitt

[57] ABSTRACT

A panning head for a photographic tripod has an improved horizontal pan adjustment for setting the force required to turn the pan head.

11 Claims, 3 Drawing Sheets

PANHEAD

RELATED APPLICATIONS

This application is a continuation in part of application Ser. No. 07/302,011, filed Jan. 26, 1989 and assigned to the same assignee.

FIELD OF THE INVENTION

The present invention pertains generally to the field of mountings and supports for photographic, imaging and other optical equipment and more particularly relates to a panhead such as used on a photographic tripod having an improved variable force panning swivel assembly by which the force required to turn the panhead can be easily adjusted and wherein the controls for swivel and tilt of the panhead are on a side opposite the tilt handle for ease of manipulation.

BACKGROUND OF THE INVENTION

Previous panheads have lacked an easy adjustment by which the resistance to movement of the panning swivel could be easily adjusted without disassembling the panhead, so as to eliminate loose play between the stationary base of the panhead and the panning body which is swiveled to the base for horizontal rotation. Japanese Patent Office Bulletin No. 19433.1985 is exemplary of this shortcoming in the prior art. In order to obtain a suitable resistance to panning movement in this previous panhead, very precise manufacturing tolerances and assembly was required which in turn lowered manufacturing productivity while increasing the ultimate cost of the device.

In still another prior art panhead disclosed in Japanese Patent Office Bulletin No. 133294,1985, the movable panning support is held to the stationary base of the panhead by means of a nut which can be tightened or loosened to adjust the resistance to panning movement. However, the nut is enclosed in the base of the unit and covered by a bottom plate which has to be removed before access to this nut can be gained. The result is considerable inconvenience in making such adjustment once the unit has been assembled. Any final adjustments require disassembly and therefore reduced factory productivity.

In such prior art units, as the panning resistance of the panhead is not readily adjusted, the swivel assembly became either too tight or excessively loose and in order to avoid this outcome precise manufacturing tolerances were required at substantial cost in productivity and labor expense. Even where a tightening function was provided in the prior art units, access was restricted. A continuing need therefore exists for a readily accessible and easy to make adjustment by which the tightness or resistance to movement of the panning, movable support element of the panhead can be effected relative to the stationary base of the unit. Such adjustment should not complicate the construction or assembly of the panhead nor significantly increase its cost.

Another general problem with panheads of the prior art is that the controls for tilt and swivel of the panhead are on the same side as the tilt handle with the result that it is cumbersome to adjust tilt and swivel locking because the tilt handle is on the same side as the tilt and swivel controls.

SUMMARY OF THE INVENTION

This invention seeks to overcome the stated shortcomings in the prior art by providing a panning head for a photographic tripod or the like having a base and a panning support swiveled or pivoted to the base about a pan axis improved by provision of a readily accessible threaded element adjustable exteriorly to the panhead, i.e., without disassembly of the same for adjusting the bearing surfaces of the stationary base and movable panning support which are slidable against each other for effecting the panning movement.

The improved panning head has a base and a panning body pivoted to the base about a pan axis, a wedge interposed between portions of said base and the pan body displaceable transversely to the pan axis for urging said base and support into variable frictional engagement to a degree determined by the position of said wedge. A screw threaded into the base or the pan body transversely to the pan axis is adjustable for positioning the wedge relative to the pan axis. The base and pan body have first and second radial bearing surfaces respectively opposed for relative sliding rotational movement. A male element having a third bearing surface is fixed to either the base or the pan body and extending along the pan axis into a cavity in the other of the base or pan body, this other having an opening transverse to the pan axis including a fourth bearing surface. The wedge is interposed between the third and fourth bearing surfaces and is driven by the screw for variably urging together the first and second bearing surfaces. More specifically the third bearing surface is the annular underside of an enlarged head on the male member and the fourth bearing surface is an interior ramped surface in the transverse opening facing the annular underside. The wedge is a bifurcated and straddles the male member between the enlarged head and the ramped surface. The first and second bearing surfaces may be mated frusto-conical surfaces coaxial with the pan axis.

In another form, the wedge is arranged so as to be accessible without having to remove a lid or cover and adjustment of the wedge is achieved through a threaded adjuster.

Regardless of the form of the panhead of this invention, the tilt and swivel controls are located on the side of the panhead opposite the side of the tilt handle with the result that one hand can be used to manipulate the tilt handle and tilt and swivel may be controlled by the other hand. This is in contrast to prior arrangements in which the tilt and swivel controls were on the same side of the tilt handle.

BRIEF DESCRIPTION OF THE DRAWINGS

FIG. 5 is a transverse section of the tilt adjustment assembly of the panhead;

DETAILED DESCRIPTION OF THE PREFERRED EMBODIMENT

Figure 1:
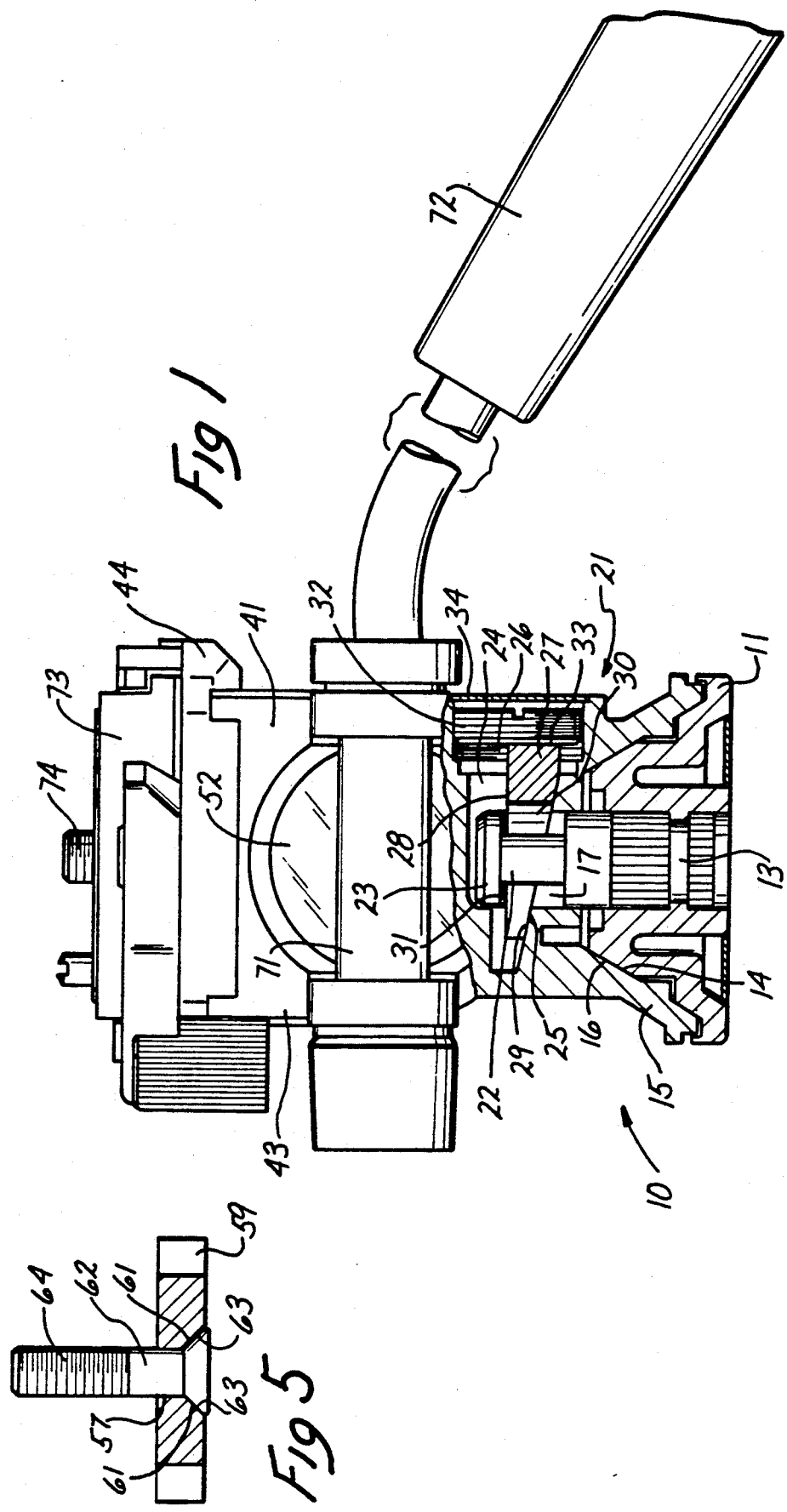
FIG. 1 is an elevational view, partially in cross-section, of the panning head improved according to this invention.

With reference to the drawings, wherein similar elements are designated by like numerals, the improved panhead 10 has a base 11 which is normally stationary and fixed to another support such as a photographic tripod, and which includes a frusto-conical bearing surface 14 centered on a pan axis coaxial with an upwardly extending shaft 22. The panhead 10 further includes a horizontally rotatable panning body 15 which has an axial cavity 24 in its underside and a frusto-conical bearing surface 16. The panning body 15 seats onto the base 11 such that the bearing surface 16 of the panning body mates to the bearing surface 14 of the base for relative rotation about the pan axis. A panning resistance adjustment assembly 21 regulates the frictional resistance to relative sliding movement between the two bearing surfaces 14,16 and includes an enlarged head 23 at the upper end of the shaft 22 within the cavity 24. An opening 26 in the panning body 15 extends transversely to the shaft 22 and intersects the axial opening 24 and includes a ramped surface 25 below the enlarged shaft head 23 and extending across the pan axis of the body 15. This ramped surface is angled somewhat to the pan axis, rising in FIG. 5 from the right-hand open end of the transverse end of this opening on the opening 24 towards the closed left-hand side. A wedge 27 has a planar upper surface 28 which slides against a radial undersurface defined by the enlarged head 23 about the shaft 22. An adjustment screw 32 is threaded into the open end of the hole 26 and abuts against the thick end 33 of the wedge 27 as best seen in FIG. 1.

The screw hole 26 is open towards the exterior of the panning body 15. The panning resistance adjustment screw 33 can be advanced into the hole 26 towards the shaft 22 by turning in the threaded hole 26, thereby pushing against the end surface 33 on the thick end of the wedge 27 which is thus driven by the advancing screw upwardly along the ramp surface 25 and consequently against the annular undersurface of the shaft head 23. This in turn draws the shaft 22 upwardly into the cavity 24. The net result is that the base 11 which is fixed to the lower end of the shaft 22 is urged upwardly against the panning body 15 so that the mated radial bearing surfaces 14,16 are urged against each other, increasing the mutual frictional engagement between the two bearing surfaces, and consequently increasing the resistance to relative rotational sliding movement between the two bearing surfaces. As a result, greater force will be required to effect panning movement of the body 15 relative to the base 11 about the shaft 22. On the other hand, if the screw 32 is turned in the opposite direction and withdrawn from the screw hole 26, the force exerted by the screw 32 against the wedge 27 is weakened, allowing the thick end 33 of the wedge 27 to move away from the shaft 22, towards the screw 32 thus reducing the wedge thickness interposed between the shaft head undersurface and the ramped surface 25 in the pan body cavity 24. This allows slight axial separation between the pan body 15 and the base 11 consequently reducing the contact pressure between the two opposing bearing surfaces 14,16 so that the resistance to panning rotation between the base 11 and body 15 is reduced and the pan body 15 swivels more easily.

Figure 2:
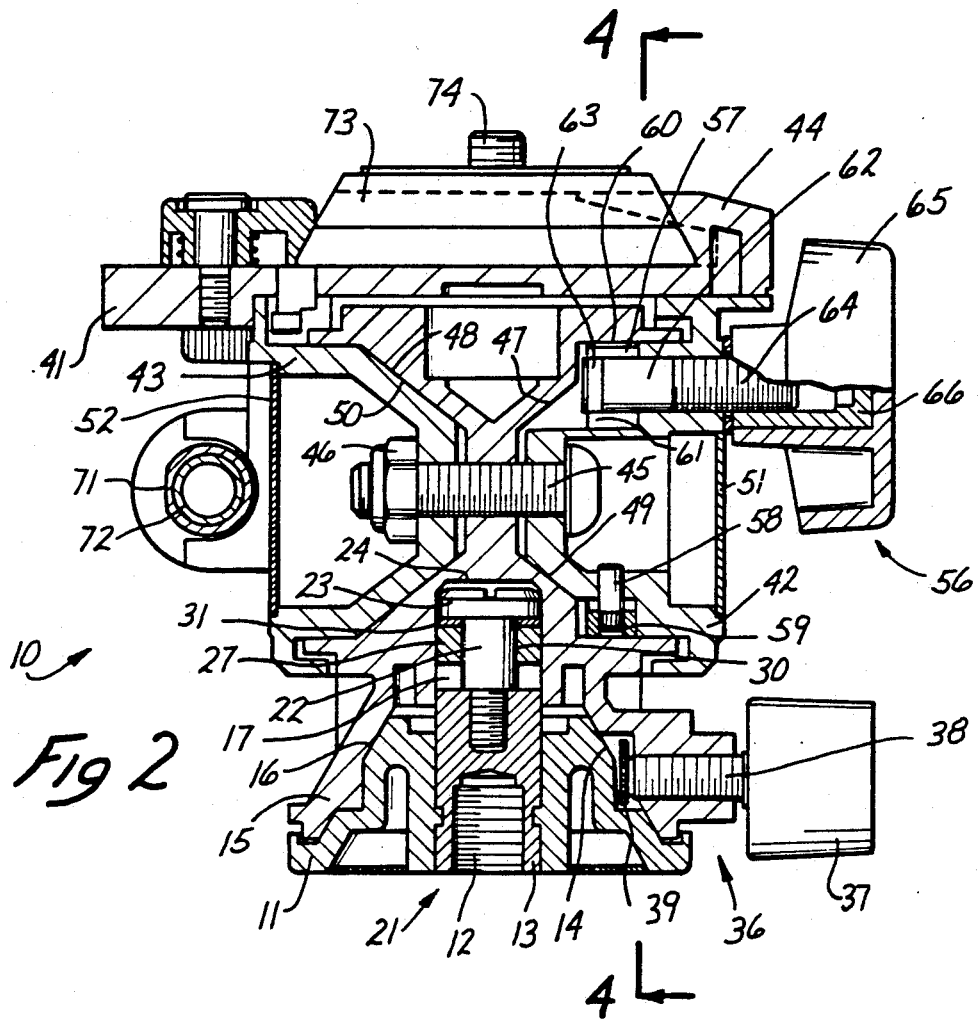
FIG. 2 is an elevational cross-section taken at a right angle to the cross-section of FIG. 1.

In a practical example of the improved panhead shown in FIGS. 1 and 2 of the attached drawings, the base 11, which may be of plastic, is fixed to the outer cylindrical surface of a cylindrical metallic insert 13 which defines the vertical pan axis and which also has a threaded mounting hole 12 which receives the mounting screw of a tripod or the like. A frusto-conical radial bearing surface 14 tapers towards the upper end of the insert 13 on the outer periphery of the base 11. A pan body 15, which may be of plastic, is seated on the base 11 and is freely rotatable in a horizontal plane about a pivot axis coaxial with the insert 13. The lower portion of the pan body 15 is concave and open and includes an inner frusto-conical radial bearing surface 16 which mates with and is freely rotationally slidable on the bearing surface 14 of the base 11, both bearing surfaces being centered on the pan axis defined by the axis of the cylindrical insert 13. Also defined within the pan body 15 is a cylindrical axial hole 17 which receives the upper end of the cylindrical insert 13 and thus, together with the opposing bearing surfaces 14,16 holds the two parts 11,15 in axial rotational alignment.

Figure 3:
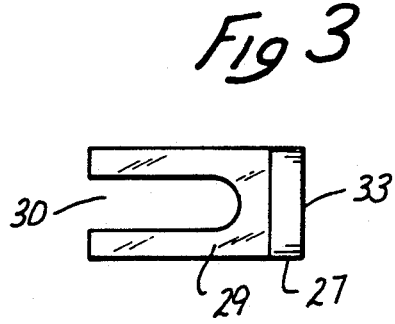
FIG. 3 is a top plan view of the bifurcated wedge element in the panhead of FIGS. 1 and 2.
Figure 4:
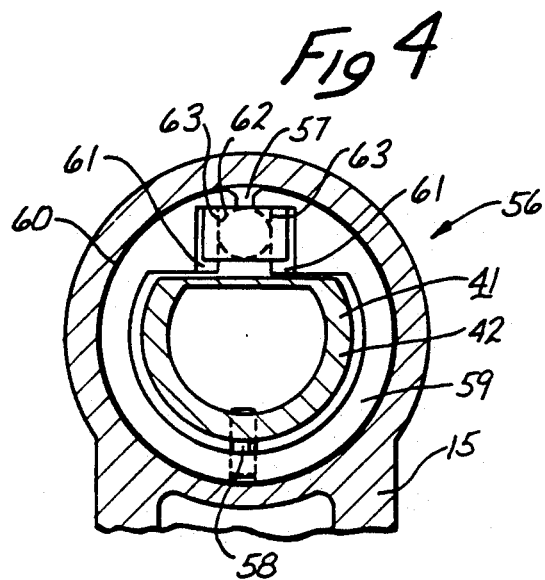
FIG. 4 is a partial vertical section taken along line 4—4 in FIG. 2.

The frictional resistance to panning movement between the pan body 15 and base 11 is adjustable by an assembly 21 which operates in the following manner. An upwardly extending shaft 22 which may be the shaft of a metallic bolt coaxially threaded into and glued in place to the top of the insert 13, as best appreciated by reference to FIG. 2, terminates in a horizontally enlarged head 23 within the bore 17. A blind hole 24 extends transversely to the bore 17 in the pan body 15 and includes a lower surface 25 which is generally transverse to the shaft 22 and spans the axial hole 17 below the enlarged head 23, and is upwardly ramped in relation to the horizontal plane in FIG. 2. The ramped surface 25 extends across the vertical bore 17 and is inclined downwardly from left to right in FIG. 1. A threaded screw hole 26 whose axis lies horizontally in FIG. 1 and is perpendicular to the pan axis is defined in the pan body 15 and opens to the exterior of this body. A wedge 27 which may be metallic is positioned within the transverse hole 24 in the pan body 15. The upper surface of the wedge 27 is planar and horizontal while the lower surface 29 of the wedge slants at an angle to the upper surface 28 similar to the angle of the ramped surface 25 relative to the horizontal plane. FIG. 3 shows the wedge 27 which in plan view is seen to be forked or bifurcated with two parallel prongs separated by a U-shaped slot 30 open towards the thin end of the wedge 27. The slot 30 receives the shaft 22 as the thin end of the wedge 27 is inserted into the transverse cavity 24, with the slanting undersurface 25 of the wedge slidable on the ramped surface 25 in the pan body 15, and the upper wedge surface 28 slidable against an annular washer 31 interposed between the wedge 27 and the annular undersurface of the enlarged head 23 surrounding the shaft 22. The washer 31 may for example be a steel and/or plastic washer.

The adjustment screw 32 is disc-like and may be of metal, and is screwed into the threaded hole 26 of the pan body 15 for advancing into or withdrawing from the hole in the body 15. The inner end of the screw 32 makes contact with the end surface 33 at the thick end of the wedge 27. The opening into the screw hole 26 may be covered by a freely movable lid 34. The base 11 and pan body 15 may be fixed to each other by a pan lock arrangement 36 which includes a screw 38 threaded horizontally into the lower side of the pan body 15 and provided with a pan lock knob 37 at its outer end and a pressure plate 39 at its inner end. The pan body 15 may be locked to the base 11 by advancing the pressure plate 39 against the outer surface of the base 11 by tightening the screw 38.

A tilt body 41 is pivoted to the upper end of the pan body 14 and can be swiveled freely about a horizontal tilt axis. The tilt body 41 is supported on a pair of arms 42,43 arranged on either side of the pan body 15, and is composed of a coupling tray 44 which is fixed to and bridges the arms 42,43. The pan body 15 and arms 42,43 are pivotably connected by the bolt 45 which passes through aligned holes in the pan body 15 and arms 42,43 along a horizontal axis, and by a retaining nut 46 threaded onto the bolt 45, all as best understood from FIG. 2.

A pair of arcuate tracks including surfaces 49,50 formed on both arms 42,43 are slidably joined with conforming arcuate surfaces 47,48 on the pan body 15, the bolt 45 serving as the tilt axis so that the tilt body 41 is freely pivotable relative to the pan body 15. The arms 42,43 are concavely shaped as seen in FIG. 2, with the concavity closed by lids 51,52 respectively as seen in FIG. 2. The pan body 15 and tilt body 41 can be locked against relative movement by tilt lock 56 which locks the tilt body 41 to the pan body 15 by pressing the circular rim of a ring 59 against the circular inner surface 60 defined within the tilt body 41 concentrically with the pivot bolt 45. The ring 59 is expanded diametrically by the pressure of the wedged end 63 of a cam body 62 which extends through the tilt body 41 against the slanted surface 61 of the portion 57. The nut 66 fixed within the tilt lock knob 65 is threaded onto the outer end of the screw shaft 64 which is integral with the cam 62. The cam 62 may thus be advanced against or withdrawn away from the tilt body 41 by turning the nut 66 and attached knob 65 to thus expand or contract the ring 59 and consequently lock or unlock the tilt body. A handle receiving portion 71 is fixed to the outer surface of the left side arm 43 of the tilt body as shown in FIG. 2, and a handle shaft 72 is fitted and extends rearwardly from the plane of FIG. 2. A removable attachment base 73 is installed on the carrier tray 44 of the tilt body 41 and a camera mounting screw 74 is provided on the removable base 73.

In production assembly of the improved panhead, the frictional resistance of the pan body 15 against the base 11 is easily adjusted by advancing or withdrawing the screw 32 by means of a screwdriver or other suitable tool while the lid 34 is removed to expose the screw hole 26. If the screw 32 is advanced into the space 24 in the pan body 15, pushing against the thick end surface 33 of the wedge 27, the thin end of the wedge is driven transversely to the shaft 22, and the slanting undersurface 29 of the wedge slides upwardly on the ramped surface 25 of the pan body 15, urging the upper surface 28 of the wedge against the underside of the enlarged head 23, thereby exerting axially compressive force between the pan body 15 and base 11, urging the opposing bearing surfaces 14,16 into greater frictional engagement. The result is increased resistance to relative rotation between the pan body 15 and base 11. Alternately, if the screw 32 is moved towards the exterior of the pan body 15, the pressure exerted by the screw 32 against the wedge 27 is reduced, allowing the thick end of the wedge to move away from the shaft 22. This reduces the thickness of the wedge interposed between the head 23 and ramped surface 25, allowing the pan body 15 to lift slightly away from the base 11 to reduce frictional contact between the bearing surfaces 14,16 and resulting in freer horizontal panning movement of the pan head. Since the resistance to panning movement is easily adjusted by the assembly 21, optimum panning force may be set even allowing for minor deviations in the manufacturing tolerances of the component parts. Therefore excessive play between the base 11 and pan body 15 can be prevented and manufacturing efficiency is increased, in part because manufacturing tolerances and precision requirements may be reduced. The improved panhead described above allows easy adjustment of the panning force required simply by screwdriver adjustment of the screw 32 which is readily accessible exteriorly to the pan body 15, even after installation on a tripod and after completion of assembly of the panhead. That is, readjustment of the panning force may be done very easily even after complete assembly thereby improving quality control and efficiency of production and manufacture. The lid 34 which covers the screw hole 26 should be installed after readjustment of the screw 26. The purpose of lid 34 is purely ornamental, in order to cover the opening of the screw hole 26, and it can be configured for easy placement or removal. This arrangement allows easy readjustment during repair and also permits each user to set the panning force according to his or her personal preference.

Figure 6:
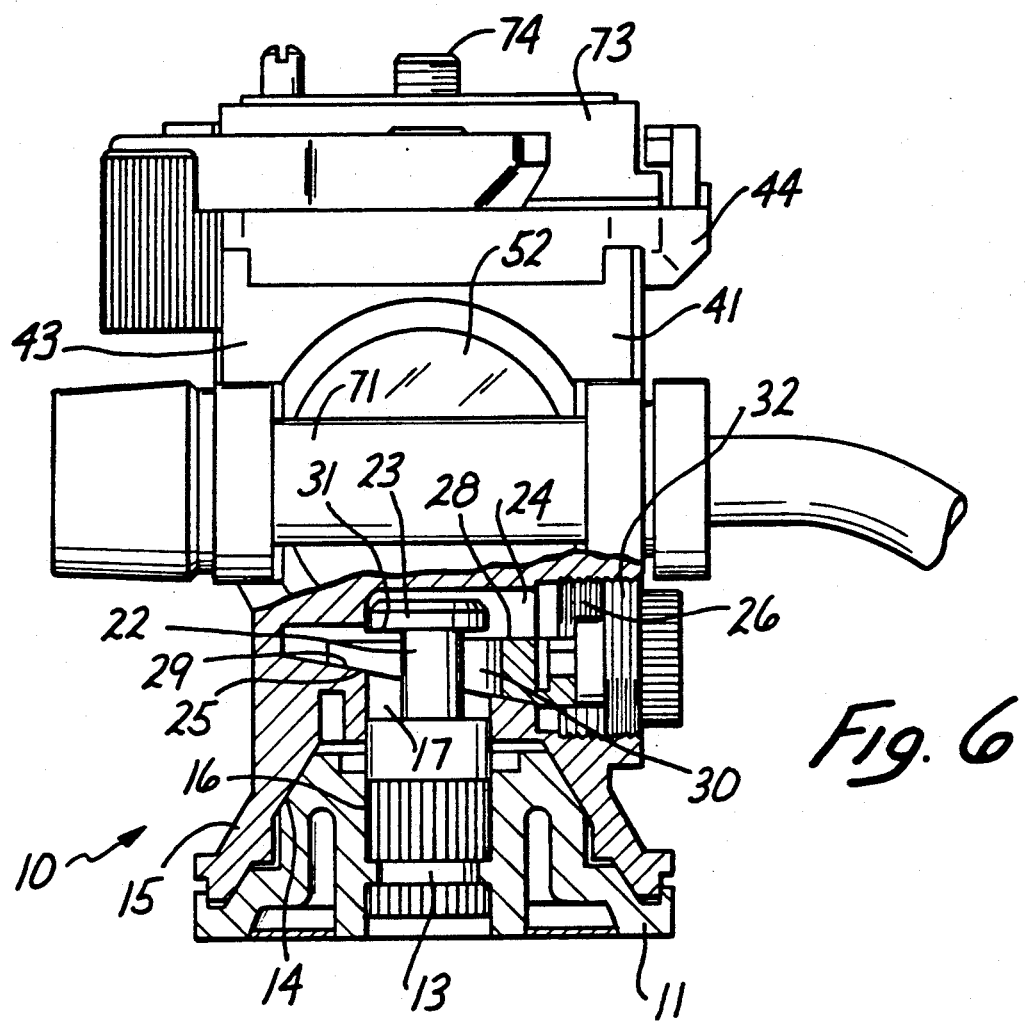
FIG. 6 is a view similar to that of FIG. 1 and illustrates a modified form of wedge arrangement in accordance with this invention.
Figure 7:
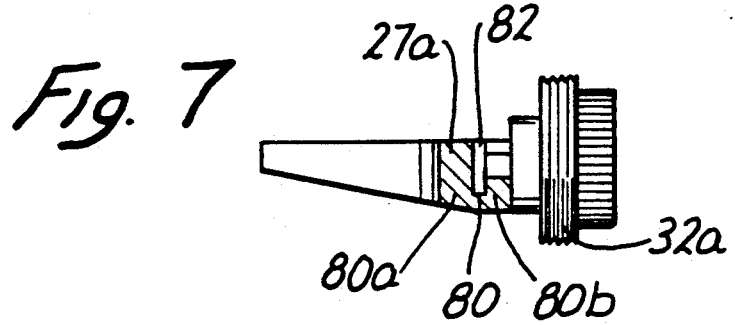
FIG. 7 is a view partly in section and partly in elevation of the form of wedge arrangement shown in FIG. 6.

Referring to FIGS. 6 and 7 wherein the same reference numerals have been used for the same parts, a modified form of wedge arrangement is illustrated which may be manipulated without removal of the cover plate 34. In this form, the wedge 27a is slotted as described and mates with the remaining parts of the panhead as already described. However, the wedge 27a includes a transverse slot 80 and the screw 36a includes a button extension 82 which is fixed to the screw 36a to rotate therewith. The end face 84 of the screw extends laterally beyond the body and is located laterally away from the handle 72 so that it is easily accessible without interference from the handle.

As seen in FIG. 7, the slot 80 forms a forward wall 80a and a rear wall 80b such that the button 82 engages the rear wall 80b. As the screw 36a is threaded inwardly, the face of the button contacts the forward wall 80a to urge the wedge to the left as seen in FIG. 6. As the screw is threaded outwardly, the rear face of the button contacts the rear wall 80b to move the wedge to the right as seen in FIG. 6. In all other respects the wedge operates as described, except that the screw 36a is accessible without the need to remove a cover plate.

One of the other features of this invention is that the control elements for tilt and rotation are positioned on a side of the panhead opposite the side on which the tilt handle 72 is arranged. The control knob 65 for tilt lock is positioned on the same side as the control knob 37 for rotational lock. Also, the control knob 37 for rotational lock is closer to the base 11 which is fixed and does not rotate relative to the tripod. This is apparent from FIG. 2. The advantage is that the user easily recognizes that the lower knob 37 is for rotational lock because it is close to the base and knows that the upper control knob 65 is for tilt simply by association of location. Thus, the user may hold the tilt handle 72 with one hand and manipulate either the tilt lock 65 and the rotational lock 38 with the other hand. In this way the relative position of the camera may be maintained by the handle 72, but adjustments may be made in tilt and rotation without changing the relative position of the camera. This relative ease of adjustment has practical and useful advantages which render the overall use of the panhead more convenient.

While a particular embodiment of the invention has been described and illustrated for purposes of clarity and example, it must be understood that many changes, modifications and substitutions can be made to the described embodiment by those possessed of ordinary skill in the art without thereby departing from the scope and spirit of the present improvement which is defined by the following claims.

What is claimed is:

1. In a panning head for a photographic tripod having a panning body with a first bearing surface seated for slidable rotation about a pan axis on a second bearing surface provided on a base, the improvement comprising:
   a male portion on one of said base and panning body extending into a cavity in the other of said base and panning body;
   wedge means interposed between portions of said male portion and a wall of said cavity for retaining said male portion against withdrawal from said cavity, said wedge displaceable transversely to said pan axis for urging said base and panning body into variable frictional engagement to a degree determined by the position of said wedge means; and
   screw means threaded into and extending laterally from said panning body and connected to said wedge means for adjusting the position of said wedge means;
   said screw means including an extension engaged for linear movement with said wedge means but rotatable in relation to said wedge means.

2. The improvement of claim 1 wherein said extension is rotatable within a slot in said wedge means as said screw means is turned in a thread defined in said panning body for advancing or withdrawing said wedge means in said cavity.

3. In a panning head for a photographic tripod having a base and a panning body with first and second opposing bearing surfaces respectively for relative rotation about a pan axis, the improvement comprising:
   a male element on one of said base and panning body extending along said axis into a cavity in the other of said base and panning body, said male element having a third bearing surface and said other having an opening transverse to said axis including a fourth bearing surface;
   a forked wedge receiving said male element between two prongs, said wedge interposed between said third and fourth bearing surfaces and displaceable transversely to said pan axis for adjusting the frictional engagement between said bearing surfaces to a degree determined by the position of said wedge, thereby setting the degree of effort required to turn said panning body on said base.

4. The improvement of claim 3 further comprising screw means threaded into and extending laterally from said panning body and connected to said wedge for adjusting the position of said wedge responsive to manual turning of said screw means.

5. The improvement of claim 4 wherein said screw means includes an extension engaged for linear movement with said wedge but rotatable in relation to said wedge.

6. The improvement of claim 5 wherein said extension is rotatable within a slot in said wedge as said screw means is turned in a thread defined in said panning body for advancing or withdrawing said wedge in said cavity.

7. In a panning head for a photographic tripod having a base and a panning body with first and second opposing bearing surfaces respectively for relative rotation about a pan axis, the improvement comprising:
   a male element on one of said base and panning body extending along said axis into a cavity in the other of said base and panning body;
   a forked wedge interposed for retaining said male element against withdrawal from said cavity and displaceable transversely to said pan axis for adjusting the frictional engagement between said bearing surfaces to a degree determined by the position of said wedge, thereby setting the degree of effort required to turn said panning body on said base.

8. The improvement of claim 7 further comprising screw means threaded into and extending laterally from said panning body and connected to said wedge for adjusting the position of said wedge responsive to manual turning of said screw means.

9. The improvement of claim 8 wherein said screw means is engaged for urging displacement of said wedge relative to said male element but rotatable in relation to said wedge.

10. The improvement of claim 9 wherein an extension of said screw is rotatable within a slot in said wedge as said screw means is turned in a thread defined in said panning body for advancing or withdrawing said wedge in said cavity.

11. In a panning head for a photographic tripod or the like having a base and a panning body with first and second opposing bearing surfaces respectively for relative rotation about a pan axis, the improvement comprising:
   a male element on one of said base and panning body extending along said axis into a cavity in the other of said base and panning body;
   a wedge having generally planar divergent surfaces engaged for retaining said base and panning head against separation along said pan axis, said wedge being displaceable transversely to said pan axis for adjusting the frictional engagement between said bearing surfaces to a degree determined by the position of said wedge, thereby setting the degree of effort required to turn said panning body on said base; and
   screw means threaded into and extending laterally from said panning body, said screw means being engaged for urging displacement of said wedge relative to said male element but rotatable in relation to said wedge for adjusting the position of said wedge responsive to manual turning of said screw means.

* * * * *